United States Patent [19]

Stone et al.

[11] 4,090,695

[45] May 23, 1978

[54] LIQUID FEEDING CONTROL METHOD

[75] Inventors: Kirby Lee Stone; Donald James Borisch, both of Cincinnati, Ohio

[73] Assignee: Cincinnati Milacron Inc., Cincinnati, Ohio

[21] Appl. No.: 751,107

[22] Filed: Dec. 16, 1976

[51] Int. Cl.$^2$ ............................ B01F 15/00; B67D 5/08
[52] U.S. Cl. ............................................ 366/76; 222/63
[58] Field of Search .................... 259/4 R, 4 A, 4 AB; 137/3, 7, 9, 12; 425/4 R, 817 R, 817 C; 222/52-57, 61, 63, 135

[56] References Cited

U.S. PATENT DOCUMENTS

| | | | |
|---|---|---|---|
| 3,908,862 | 9/1975 | Chandra et al. | 222/63 |
| 3,912,234 | 10/1975 | Peter | 259/4 R |
| 4,008,829 | 2/1977 | Chandra et al. | 222/63 |

Primary Examiner—Leonard D. Christian
Attorney, Agent, or Firm—Daniel P. Worth

[57] ABSTRACT

Liquid reaction molding (LRM) shot size and ratio control is achieved using a programmable controller (microprocessor) to select on a first-come-first-served basis one mold from among several and to manipulate a plunger metering pump system by retracting each of a pair of pump plungers to the same position each time the system is reset and to decompress or reduce pressures after injection. Each and every shot is started from this uniform reset position. Later steps in the sequence are: taking the hydraulic slack out of each pump system by prepressurizing which is done by advancing each plunger from said position independently until each and all liquid systems reach a threshold pressure (which pressure may differ from one liquid system to the other), feeding the shot size or quantity of each liquid (i.e. injection) by advancing the plunger a predetermined amount (or stroke) from the place it arrives upon reaching the threshold pressure, and to decompress by reversing plunger movement after injection but before any valve manipulations occur. Ratio control is exercised by slaving one plunger to another plunger during injection. The position of the pump plungers where the threshold pressures are reached is called a "floating zero."

A satellite LRM system has a single shot size control and feeding system (as above) furnishing reagents to one of several molds connected to it in response to a first-come-first-served selection program in the controller. The above uniform reset feature permits faster response to a request for a shot.

6 Claims, 13 Drawing Figures

Fig. 6

| SIGNAL NO. | SIGNAL NAME | SHOT PREP | WAIT (MAY=0) | PRE-PRESSURIZATION | INJECTION | DECOMP |
|---|---|---|---|---|---|---|
| SN1 | OPEN BYPASSES V101-V102-VX-VY | ▪ | | ■ | | ■ |
| SN2 | OPEN INLETS V1, V3 | ■ | | ■ | | |
| SN3 | OPEN RETURNS V2, V4 | ■ | | ■ | | |
| SN4 | OPEN ONE SELECTOR/SHUTOFF 301-02, 401-02 | | | ■ | | ■ |
| SN5 | CLOSE ALL OTHER SELECTOR/SHUTOFFS | | | ■ | | ■ |
| SN6 | PREPRESS MASTER 17, P1 | | | ▪ | | |
| SN7 | PREPRESS SLAVE 18, P2 | | | ■ | | |
| SN8 | FLOATING ZERO ; P1 + P2 | | | | ▪ | |
| SN9 | RETRACT PLUNGER 121 | | | | ■ | |
| SN10 | INJECTION— 17, 18 ADVANCE SLAVED | | | | ■ | |
| SN11 | REVERSE 17 AT LOW VELOCITY; DECOMPRESS | | | | | ■ |
| SN12 | REVERSE 17 AT HIGH VELOCITY: SHOT PREP. | | ■ | | | |
| SN13 | REVERSE 18 AT LOW VELOCITY: DECOMPRESS | | | | | ■ |
| SN14 | REVERSE 18 AT HIGH VELOCITY: SHOT PREP. | | ■ | | | |
| SN15 | RESET | | | | | |

TYPICAL LRM CYCLE (SIMPLIFIED)

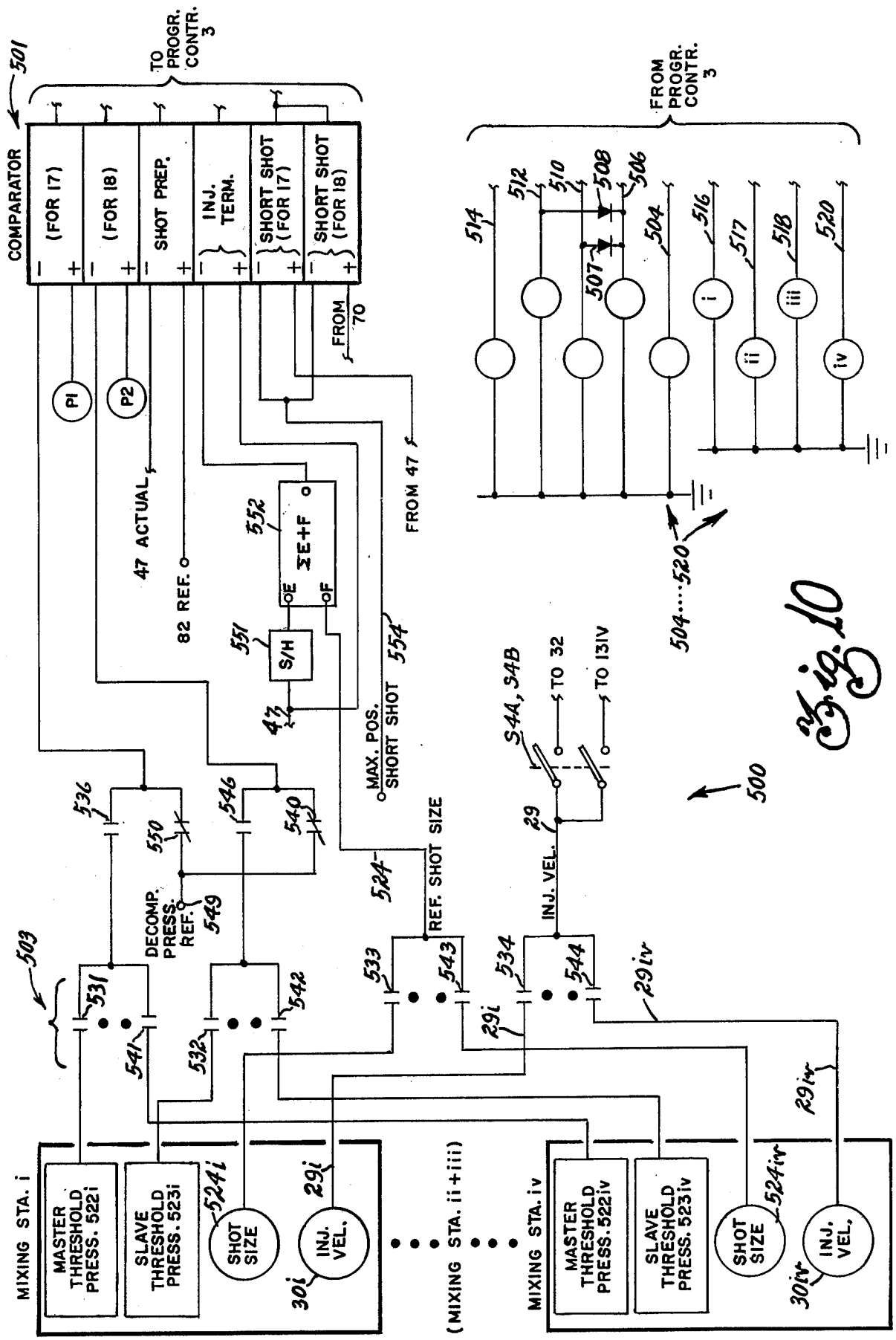

LIQUID FEEDING CONTROL METHOD

BACKGROUND OF THE INVENTION

This invention relates to an improvement in a method for control of the feeding of a liquid. In a preferred embodiment it relates to an improvement in a shot size control method in a liquid reaction molding (LRM) system where at least two liquid reagents are mixed in substantially a predetermined ratio and injected into one of a plurality of molds, selected by a programmable controller on a first-come-first-served basis, in connection with which the invention will be described.

LRM systems typically bring together measured amounts of at least two liquid reagents that chemically react to form a solid. A liquid polyol (e.g. a polyester) and polyisocyanate are thus reacted to form a polyurethane. In such a system, the liquids are measured or metered, vigorously mixed en route to the mold, and injected into the mold where they are solidified by curing if a thermoset plastic is being made.

As explained in further detail below, shot size control for liquid reaction molding (synonymous for present purposes with reaction injection molding and liquid injection molding) has been achieved by the use of a positive displacement injection means, in some devices a plunger type pump where the volume swept through by the piston determines the amount of liquid moved. However, the injection termination position (a sort of top dead center) has commonly been fixed at a location having a sufficient clearance volume that the plunger would not physically strike the end of the cylinder in which it reciprocates.. This practice has lead to establishing the starting position of the stroke necessary by first establishing the termination position and then measuring back by the amount required for injection and other events of the cycle.

The prior art practice presents no particular complications as long as all of the shots are the same size, and so long as the reagent conduits have substantially the same elasticity, flow characteristics, pressure drop, etc. However, complicated problems arise if successive shots require substantially different swept volumes for the plunger. Such is the case if different size moldings are made on successive shots and/or if the respective reagent conduits have different hydraulic characteristics such as those mentioned above. For one thing, such a situation (different swept volume requirements) inherently needs different injection stroke each time and therefore requires some sort of program to reset the plunger to a different starting place for each successive stroke.

The present invention is directed to an improved method which facilitates having different plunger strokes on successive strokes. Simply stated the present invention requires resetting the plunger to the same starting position each time. The starting position is so located that there is more than enough volume for its stroke plus the other requirements of the cycle including having a clearance volume sufficient to avoid bottoming out. The termination position is different if the stroke is different. This differs from prior art practice where resetting would be done to a different position each time but would terminate at the same position upon completing the injection stroke.

The present invention is applicable to a wide range of liquid reaction molding systems, and has its preferred application to those systems where one metering system services a plurality of molds each of which may require a different volume of material to fill its mold cavity.

Other objects, advantages and features will be understood from a reading of the following specification in connection with the annexed drawings wherein:

FIG. 6 is a timing chart showing the main events for a cycle of the system of FIG. 1;

Figure 1:
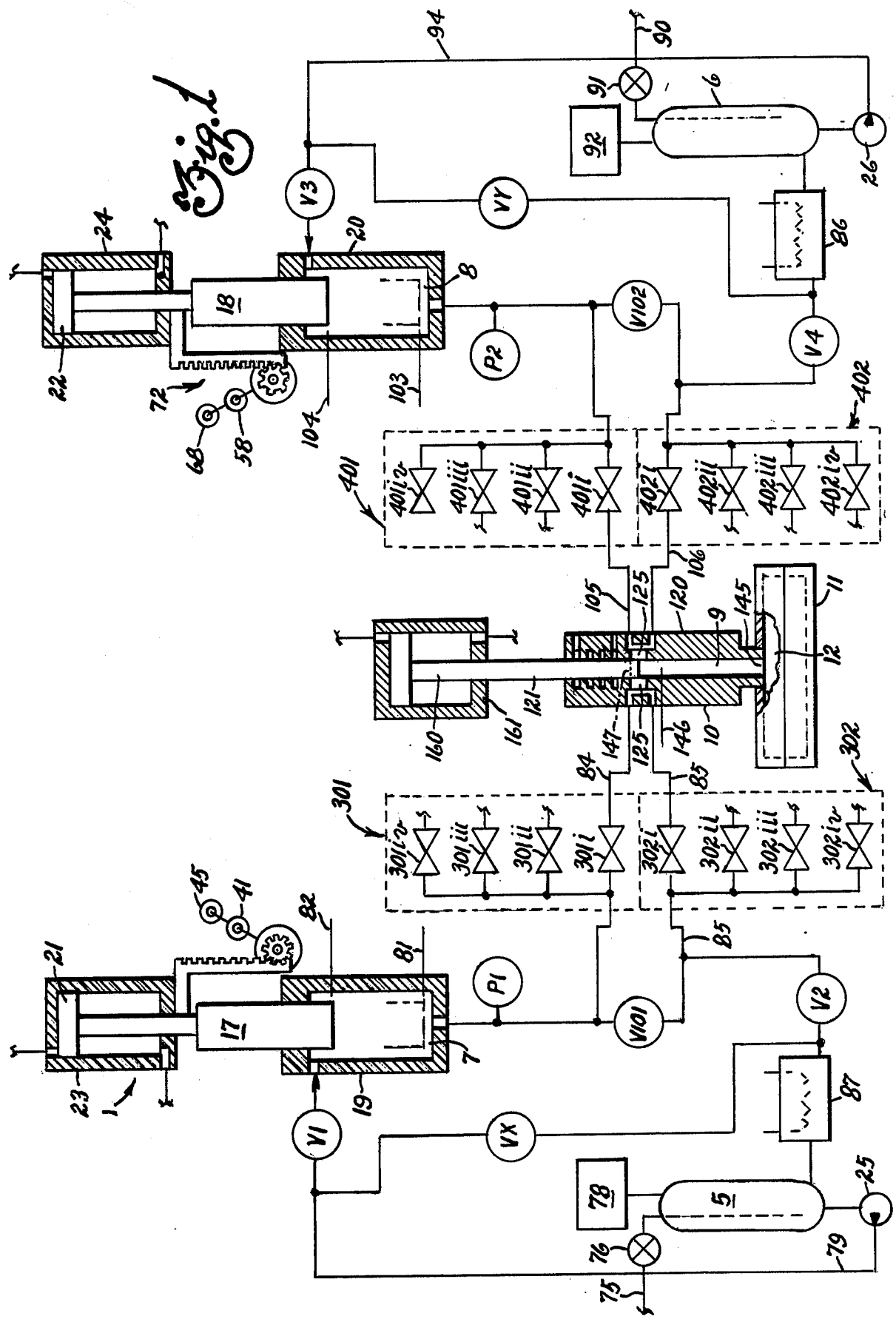
FIG. 1 is a schematic diagram of a preferred liquid reagents system to which the present invention is applied.
Figure 2:
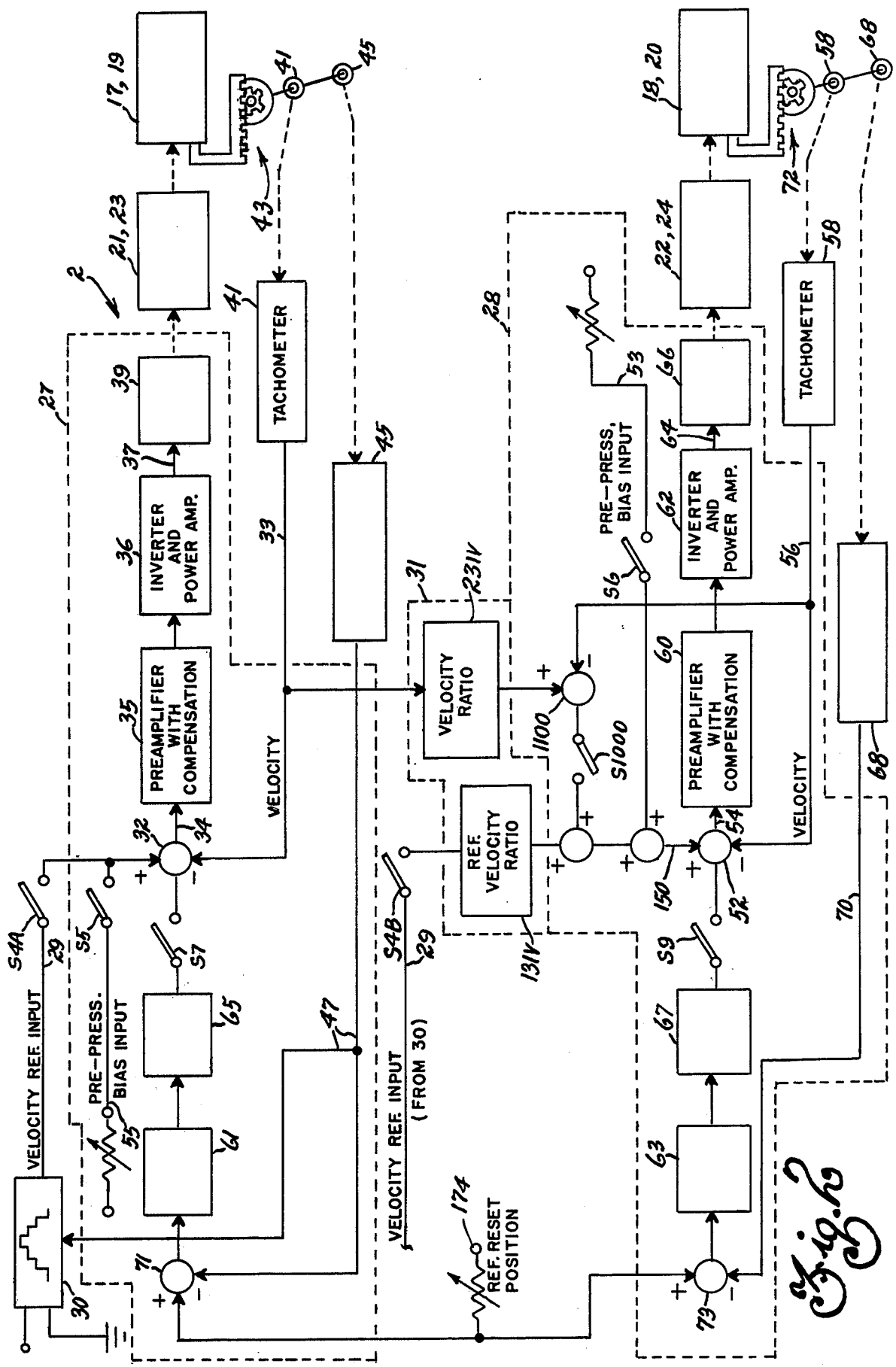
FIG. 2 is a schematic diagram of a preferred embodiment of a control system for operating the system of FIG. 1.
Figure 11:
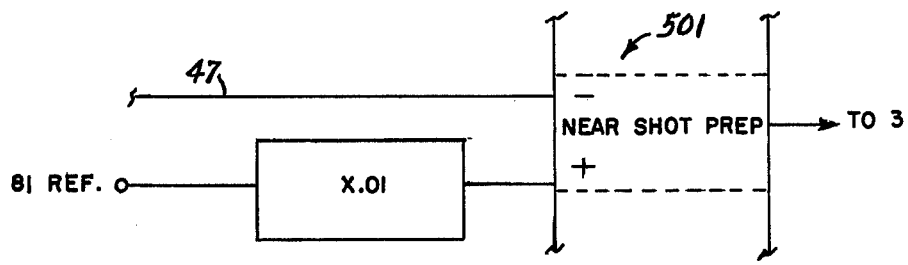
Figures 7, 9:
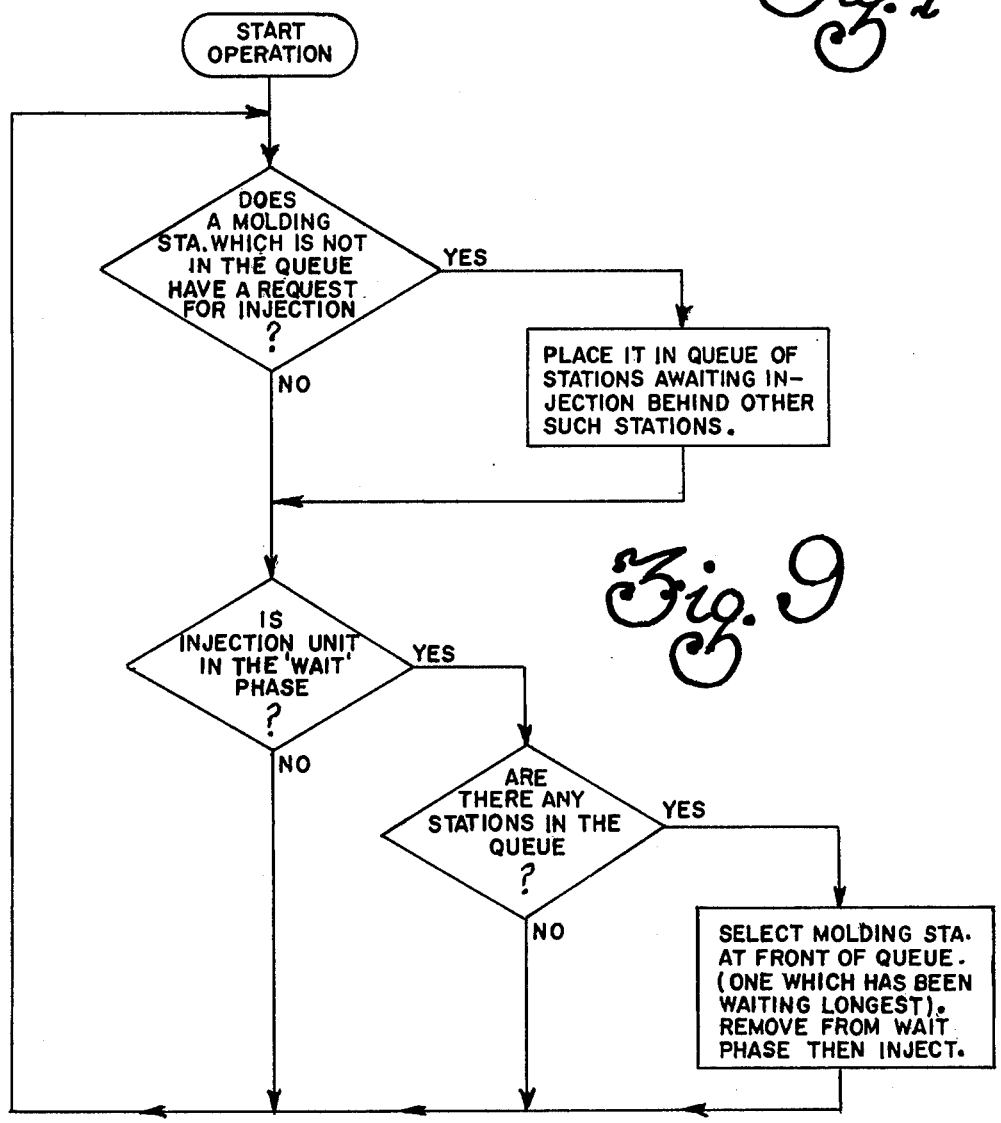
FIG. 7 is a representative timing chart for operating the satellite system of FIG. 7 and shows how a succeeding cycle overlaps its predecessor.
Figure 8A:
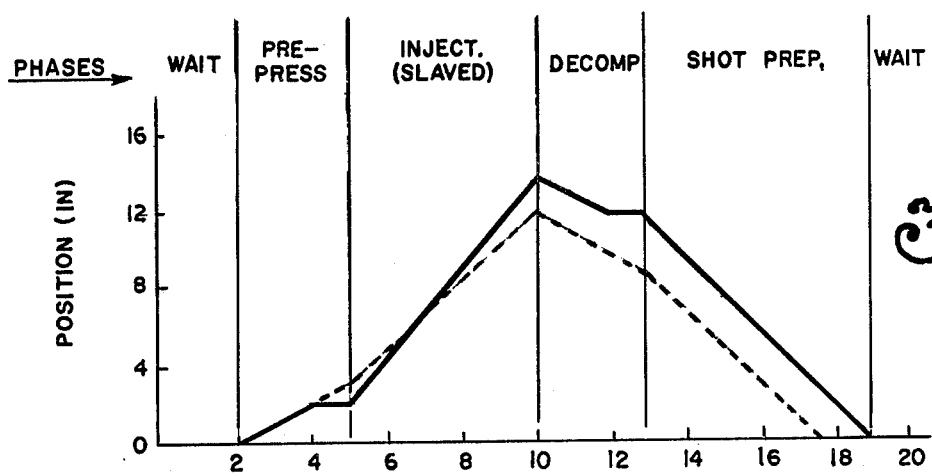
Figure 8B:
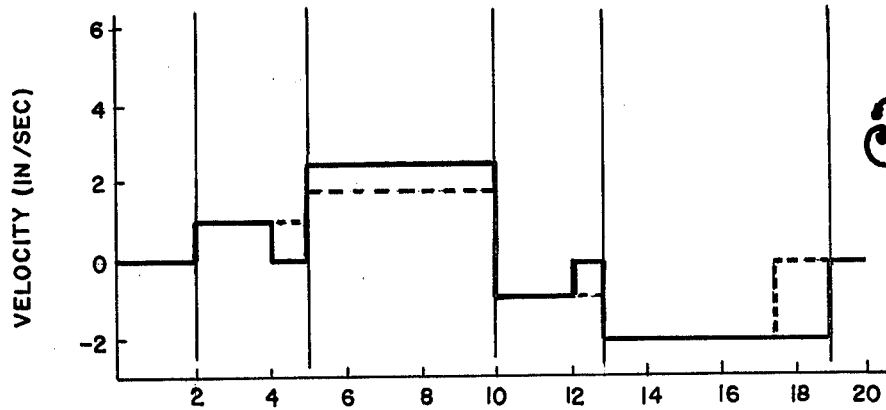
Figure 8C:
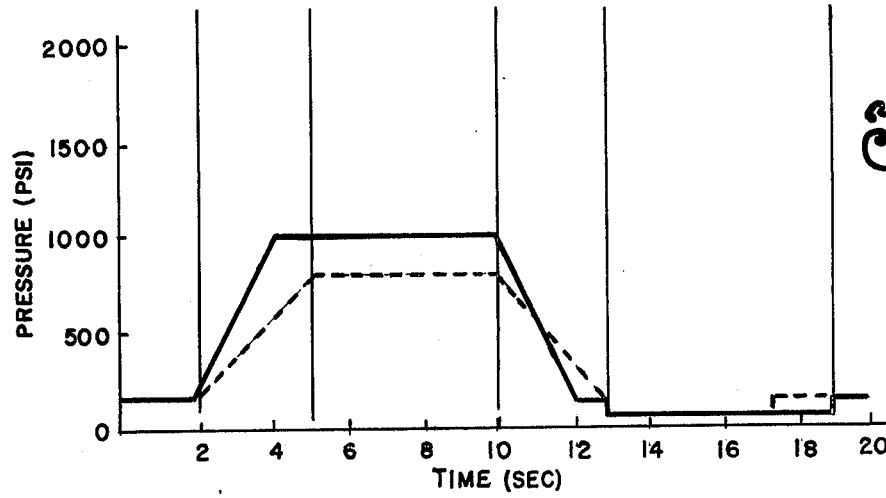

FIG. 8A, 8B, 8C each present a simplified cycle of events of, respectively, plunger position, plunger velocity and pressure all on a time base as related to FIGS. 1, 6;

FIG. 9 illustrates a preferred flow chart for queuing requests for injections from plural molds and honoring same on a first-come-first-served basis; and FIG. 10 schematically illustrates preferred wiring and relay means for connecting a selected mixing station to the programmable controller and to the control system of FIG. 2; and FIG. 11 schematically illustrates a preferred modification to the means of FIG. 10.

The present invention is an improvement in systems such as described in issued U.S. Pat. Nos. 3,908,862 and 3,912,234 respectively granted Sept. 30, 1975 and Oct. 14, 1975, and allowed U.S. application Ser. No. 604,342 filed Aug. 13, 1975 now U.S. Pat. No. 4,008,829, all commonly owned.

The aforementioned patents and allowed application are jointly and severally incorporated herein by reference.

DESCRIPTION OF PRIOR ART OF FIG. 4

Those not familiar generally with the system of FIGS. 1-3 should first read the sections below describing same or the above patents and application.

Figure 4:
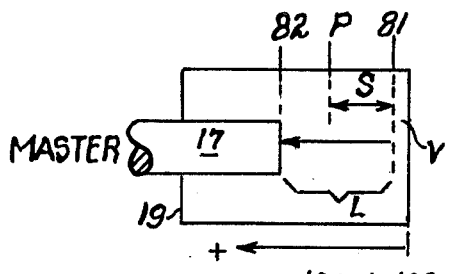
FIG. 4 represents schematically a portion of the prior art.

Previously, shot size control has been achieved by measuring back from the injection termination position. In such an arrangement as shown in FIG. 4, the termination positions 81,103 were fixed at a location near the bottomed out position of each cylinder assembly 19 and 17; 20 and 18 (having respectively a clearance volume V,v sufficient to avoid the plunger 17,18 physically striking the cylinder bottom) and the shot prepared position 82,104 was the sum — measuring backwards towards the beginning of the stroke — of the respective injection termination positions 81,103 and the total movement or stroke L,*l.* Stroke L,*l* was the sum of prepressurizing movement P,*p* and injection stroke S,*s.* The shot prepared positions 82,104 thus varied with shot length L,*l* e.g. due to differences in injection stroke length S,*s* and prepressurizing variables P*p* such as hose (conduit) sponginess, liquid reagent compressibility, and mold cavity size (as in satellite systems infra) etc.

which alter shot prepared position 82,104, but requires termination position 81,103 to remain constant.

Figure 5:
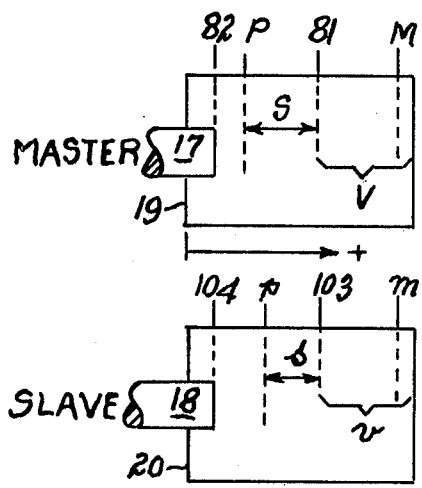
FIG. 5 represents schematically the present invention.

Summary of Present Invention Per FIG. 5

The present invention revises the above concept for shot size control by resetting each plunger 17,18 to the same position each and every time (FIG. 5) while providing more than enough room for the total required stroke which in all events provides a clearance volume V,v sufficient to prevent the plunger from striking the end of the cylinder, a phenomenon called bottoming out. Additionally, a fail-safe control system — with redundant features if desired — can be provided. As schematically shown in FIG. 5, each of the shot prepared positions 82,104 at the fully retracted positions of the plungers 17,18 and each injection termination position 81,103 is the sum of the prepressurized position P,p and the shot or injection stroke length S,s. The shot prepared position 82,104 is the same on each shot regardless of what size of shot (i.e. injection swept volume S,s) is called for but the injection termination position 81,103 may vary (e.g. in satellite systems infra) with both shot length S,s and the prepressurized position P,p. Preferably, the plungers 17,18 are prevented from bottoming out by aborting a shot anytime that the injection termination position is greater (i.e. closer to the cylinder bottom) than some maximum value M,m for either. Limit switches wired into an OR circuit to shut off the hydraulics may conveniently be used to abort when either plunger reaches M or m.

Figure 3:
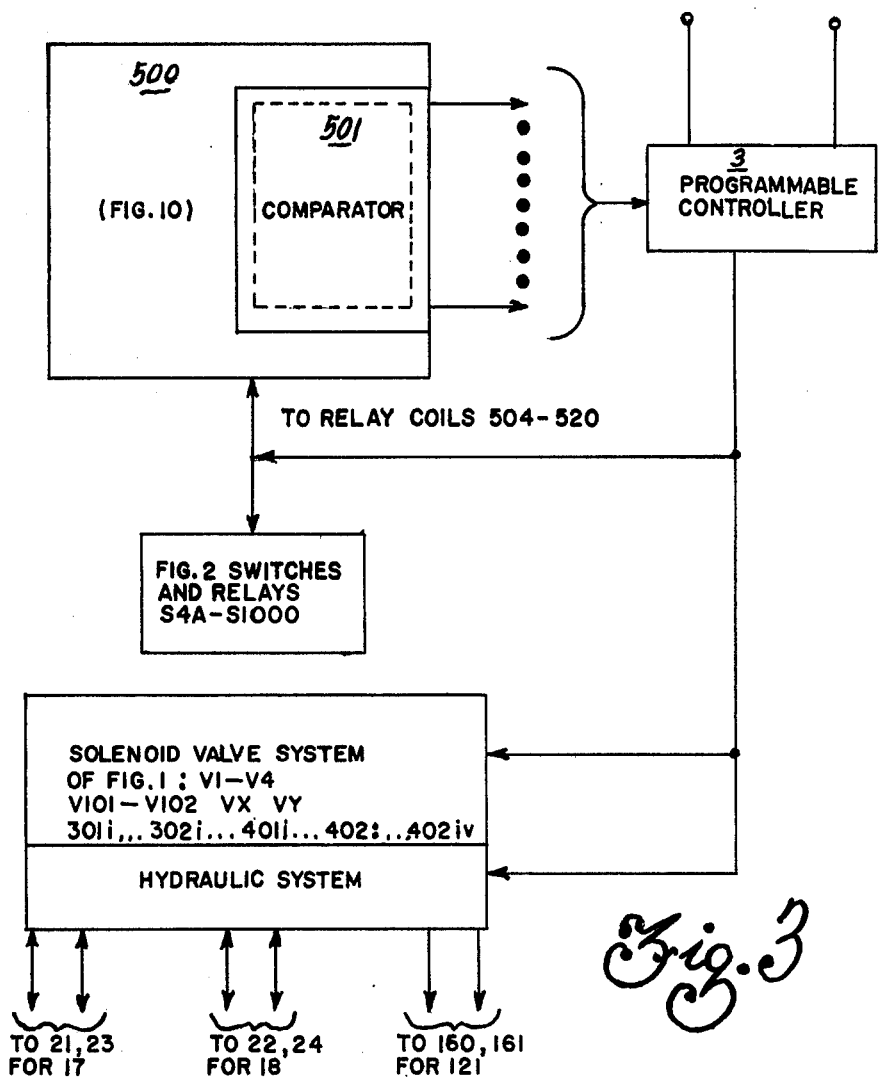
FIG. 3 is a schematic diagram illustrating how a programmable controller cooperates with the systems of FIGS. 1 and 2.

The systems under consideration have a master-slave relationship during injection stroke, S,s only but not otherwise so that ratio control can be properly exercised through a slaved ratio control means 31 (FIG. 2) in the manner described in one or another of the patents incorporated herein and/or in the manner described herein especially with reference to FIGS. 1, 2 and 3. However, the preferred embodiment hereof does not employ the slave concept during the rest of the cycle. During the prepressurizing step both the master and slave plungers 17,18 independently move and arrive at their respective threshold pressures as sensed by pressure switches P1,P2 and dwell (don't move — see FIG. 8A at 5 seconds) at prepressurizing positions P,p before they are coupled up to a master-slave relationship for injection S,s.

Thus, the present invention is concerned primarily with resetting each metering plunger 17,18 to FIG. 5 positions 82,104 and operating it independently up until the time that an injection event occurs. During injection, the master-slave relationship is maintained to enhance ratio control during injection into mold cavity 12, and then the two cylinders are uncoupled, speaking in a control fashion, to remove the slaving aspect during resetting and subsequent events.

The present invention is preferably applicable to a satellite system, i.e. one using a single reagent metering system with its attendant controls (per FIGS. 1, 2 and 3 below) to service a plurality of molds and clamps each of which mold may have a different respective shot size or injection stroke S,s characteristics due to different mold cavity 12 volume and different hydraulic characteristics in the reagent conduits 84,105 (due to e.g. conduit elasticity, pressure drop, compressibility of the liquids involved), and other similar factors which will affect the position P,p where prepressurizing ends and the metering stroke for injection begins.

The plunger 17,18 position at the end of prepressurizing (position P,p) thus changes from stroke to stroke in satellite systems, that is it floats: even so, the strokes S,s are always measured from P,p: This is the floating zero capability and is described further in connection with the satellite system of FIGS. 7,9.

System to Which Invention is Applied — FIGS. 1, 2 and 3

This portion of the description is directed primarily to the automatic control system 2 illustrated in FIG. 2, as applied to the molding of polyurethane articles to control the metering, mixing and injection system 1 of FIG. 1. The sequencing means 3 is preferably a programmable controller and regulates the sequence of events as illustrated and described generally in FIGS. 6,7,8,9. The metering and mixing head details are as in the referenced patent rights.

The present invention resets the plungers 17,18 to the same position after each injection cycle.

The FIG. 1 system feeds polyisocyanate and polyol from reservoirs 5,6 to individual metering chambers 7,8 whence they are removed in a preselected ratio to a chamber 9 in a mixing head 10 where they mix intimately and then flow directly into the cavity 12 of mold 11. The reagents do not contact each other until they enter the mixing chamber 9 but once they have been mixed and at least partially reacted in chamber 9 they flow into the mold 11, are cured in well-known fashion, and a thermoset product shaped like cavity 12 is then recovered.

The system of FIG. 1 is particularly well adapted to what is called liquid injection molding which handles reagents that are capable of very fast reaction such as the polyisocyanate and polyol used to form thermoset polyurethane that is injected into the mold. Reaction times in the mixing head 10 to form gels are the order of about three seconds, the curing time in the mold is on the order of about two minutes, and a typical cycle time for molding an article weighing 15 pounds is about two minutes.

The metering or variable volume chambers 7,8 of FIG. 1 are controlled by the system of FIG. 2 to deliver a preselected ratio of reagents e.g., a weight ratio of polyisocyanate to polyol. Preferably each metering chamber is a positive displacement liquid feeling means and is mechanically constructed to include a plunger or piston 17,18 operating within a cylinder 19,20 through a swept volume of preselected but variable or adjustable magnitude: each plunger preferably is directly driven by a hydraulic piston 21,22 which is moved within its respective cylinder 23,24 responsive to the control systems of FIGS. 2 and 3. Preferably a single stroke of each metering plunger 17,18 in its respective cylinder completely exhausts the reagents therefrom and delivers that quantity of reagent into the mixing chamber 9.

The system of FIG. 1 is designed to keep the two reagents, e.g. isocyanate and polyol, from any contact with each other until they are delivered into the mixing chamber. The reagents are recirculated through the conduit paths described below during those times that they are not being delivered into the mixing chamber.

The operating sequence including sequential control of the valving V1-V4,V101,V102,VX,VY and satellite selector or shut off manifolds 301,302,401,402 of FIG. 1 — is achieved by the program in the controller and the control system of FIG. 3 to direct reagents at desired times to certain flow paths and/or to the metering cylinders and to cause delivery from such cylinders into the mixing chamber as will be explained below. Generally, the pumps 25,26 operate continuously to feed an excess of each liquid to the chambers 7,8 the excess being recirculated until such time as the valving V1-V4,V101 and V102 and mixing head 10 are operated to shut off recirculation and conduct mixing and injection program. All the valves V1-V4,V101,V102,VX,VY may be hydraulically operated ball valves or, if desired, solenoid (electrical) operated valves, but preferably are pneumatically operated where the compressed gas (air) is controlled by electrical solenoids.

Operation of manifolding 301,302,401,402 is explained below in another section. FIG. 1 only shows one mold 11 and its associated mixing head 9, reagents to which are illustrated as controlled by manifold valves with postscript "$i$" namely valves 301$i$,302$i$; 401$i$,402$i$. Other postscripts control an identical arrangement for another but not illustrated mold and clamp: thus, e.g., another mold 12 has another mixer 9 (and another hydraulic cylinder 160,161 too, of course) connected with one liquid flowing through valves 301iii and 302iii and the other liquid through 401$iii$ and 402$iii$.

VX and VY are cylinder bypass valves that — with some overlap per FIG. 6 — are open to bypass cylinders 19,20 while valves V1-V4 are closed and vice versa. Bypass valves V101,V102 when open allow flow through two paths into mix head 10 after V1-V4 are closed by flowing through lines 84,85; 105,106 during injection and ending when the mixing head ports 125 are covered by plunger 121 advancing to 146. The four bypass valves are operated together, are closed during most of the shot preparation step, the wait step, and are open during the other steps (FIGS. 6,7,8).

The present invention controls the ratio of liquids delivered from the metering chambers, 7,8 of FIG. 1 using the master-slave control system 2 of FIG. 2 and the resetting manipulation as explained elsewhere. The control system 27 is shown as the master, the control system 28 is illustrated as the slave, and ratio means 31 for establishing the ratio by which the slave is completed to or controlled by the master. This arrangement can be reversed to permit changing from polyisocyanate being master to where the polyol becomes the master and the polyisocyanate the slave.

For purposes of description the isocyanate will be the reagent in the master system.

The system of FIG. 2 injects into cavity 12 by advancing both of the metering plungers 17,18 simultaneously whereby their respective liquids are fed simultaneously to the mixing head 10 thence to cavity 12. However, the velocity or rate at which the master liquid is forced out of its metering chamber 7 is programmed on velocity programmer 30 in accordance with the velocity (i.e. rate) desired at each position at each increment of distance that the master (isocyanate) metering plunger 17 arrives at. Therefore, it can be said that this is a position coupled programmable velocity controlled ratio injection system for multiple component liquid injection molding.

The control system of FIG. 2 has a programmed velocity means 30 to drive both metering systems in a controlled fashion, but simultaneously. A ratio means 31 has the master-slave velocity ratio control means that includes a reference velocity ratio means 131V and a feedback velocity ratio means 231V to which are applied signals, respectively, from the programmed reference velocity signal source 30 and from the master velocity feedback loop 33. This improves the relationship of plungers 17,18 dyring the time they advance to expel liquids. The velocity coupling allows both to start and to continue to feed simultaneously.

Ratio Control System of FIG. 2

The FIG. 2 system allows the operator to set in these adjustments: a reference velocity or the velocity profile in the programmed velocity means 30 (patch panel) and the ratios 131V, 231V in the ratio controller 31. The ratio of the velocity of master plunger 17 to that of slave plunger 18 is called the velocity ratio or control ratio. The ratio means 31 may conveniently comprise potentiometers in electrically separate circuits.

The FIG. 2 system includes first and second feedback control system means 27,28 (the master and slave portions) for controlling their respective feeding means 17, 19 and 18,20. Negative feedbacks are used for both the velocity 33,56 and position feedbacks 47,70, The master-slave system of FIG. 2 is enabled only during the time that the plungers 17,18 in the metering cylinders are advancing and expelling the liquid therefrom and at other times is disabled. The sequence of other control functions of the system (FIGS. 6-8) as a whole are taken care of by programmable controller means 3. Similarly, the FIG. 2 system is sequenced by manipulation of the switch means S4A-S9, S1000 which are in turn enabled at the proper times by means described in one or another of the patents and applications incorporated herein.

The patch panel 30 is shown as used to set in the programmed velocity (reference velocity signal) or velocity profile whereby the master metering plunger 17 velocity is programmed for each of a series of positions of the master metering plunger 17. In handling polyurethane reagents, preferably the velocity profile of the isocyanate metering plunger 17 would be established by the operator on the patch panel. For simplicity, a constant velocity signal could be provided from a reference terminal.

The output signal 29 from the patch panel 30 is a reference velocity (for each master plunger position) which is fed forward to the control summing junction 32 for the master velocity feedback control system 27 and is also applied to velocity input terminal of the ratio controller 131V. The summing junction 32 is part of the velocity feedback system and as well-known algebraically sums signals applied thereto, in this case sums the reference and feedback velocity signals 29,33 respectively, to provide a control signal 34 which is then fed forward through a preamplifier 35, and power amplifier 36 means as control signal 37 to a servovalve 39 for controlling the hydraulic fluid admitted to the hydraulic cylinder 23 driving the master cylinder plunger 17 of FIG. 1.

The signal 33 representing the feedback velocity may advantageously be obtained in well-known fashion by a means for measuring the rate of liquid feeding such as by an electric tachometer 41 driven off the rack and pinion system 43 secured to the plunger 17. The rack and pinion 43 also drives position sensor potentiometer 45 which generates signal 47 representing master cylinder plunger 17 position.

The controller 31 is adjustable for the master-slave e.g. isocyanate/polyol, ratio and is used to operate the slave servo-system 28 for delivering polyol in a predetermined ratio to the isocyanate; each of the controller multipliers 231V, 131V is preferably a potentiometer but could be a computing amplifier designed for multiplying operations.

The master servo-system 27 applies the signal 33 representing master cylinder plunger velocity to velocity ratio means 231V of the ratio controller 31 and to the summing junction 32. The position interlock of the parent case is eliminated.

The master system 27 of FIG. 2 is operated during the shot preparation step, when S7 is closed and S4A,S5 are open from input signals consisting of a reset position reference signal 174 obtained from a position reference source common to both the master and slave systems. During injection the master system receives at summing junction 32 velocity signals 29,33 from the source 30 and tachometer 41. The algebraic sum 34 of the signals applied to velocity summing junction 32 is obtained and fed to the servo 39 which controls hydraulic liquid to the cylinder 21.

The slave system 28 of FIG. 2 is operated during the shot preparation step, when S9 is closed and S4B, S1000, S6 are open, from input signals consisting of a reset position reference signal 174 obtained from a position reference source common to both the master and slave systems; and during injection the slave system receives the signal 150 from the two velocity ratio means 131V and 231V. This is the only input during this step although the slave side has a velocity feedback 56 from tachometer 58. The reference velocity 29 is applied through switch S4B to velocity ratio means 131V and added to the signal received from switch S1000 which in turn is the algebraic sum of the signals applied to velocity summing junction 1100, respectively, being the feedback master velocity 33 after multiplication for ratio in means 231V and the feedback slave velocity 56. Summing junction 52 sums the signal 150 with the slave feedback injection velocity 56 to produce the control signal 54.

Bias input voltages 53,55 are provided from a power supply to their respective summing junctions 52,32 during the prepressurizing step of the cycle. Their purpose is to cause slow initial advance of the metering plungers 17,18 so that pressure builds up in the lines leading from the metering cylinders to the mixing cylinder. The pressure builds up individually until each pressure switch P1 and P2 exceeds its respective threshold pressure (FIG. 6). When both P1,P2 have exceeded their respective threshold pressure, this signals the end of prepressurizing and initiates the actual injection phase. The bias voltages are applied to the system by closing switches S5 and S6 during the prepressurizing step: S5 and S6 are open at other times. During the injection step switches S4A and S4B are closed to apply the velocity reference input to the system.

A slave velocity feedback signal 56 from the slave electric tachometer 58 is applied to the feedback summing junction 52 and the velocity feedback summing junction 1100. The control signal 54 obtained by summing the inputs to junction 52 is applied through suitable preamplifying and power amplifying means 60,62 respectively as control signal 64 to the hydraulic servo-valve 66 for regulating the advance of the slave metering plunger 18.

The slave system 18 has a plunger position potentiometer 68 that generates signals 70 representing slave plunger 18 position.

A gain control 61,63 and limiter 65,67 are connected to each of the master and slave loops, respectively. A position feedback summing junction 71,73 is provided to each of the master and slave loops, respectively. The reference reset position signal source 174 is connected to the summing junctions 71 and 73, the output signals from which latter two are applied to the master and slave circuits, respectively, by closing switches S7 and S9 during the shot preparation steps but not during the prepressurizing and injection steps when switches S7,S9 are open. Steps related per se to the mold manipulation cycle such as opening, closing, ejection, curing or cooling are sequenced by conventional means associated with the mold.

The velocity control signals for the FIG. 2 system are obtained preferably by liquid feed rate measuring means or preferably a velocity measuring means such as electric tachometers 41,58 which are respectively associated with rack and pinion drives 43,72 on the hydraulically driven metering plungers controlled by the FIG. 2 system. In similar and well-known fashion, potentiometers 45,68 are each a distance measuring means driven by their respective rack and pinions to provide the requisite position feedback signals 47,70. These position signals are also used in the sequencing control system of FIG. 3 to manipulate switches S4A-S1000 and to start and stop the advance and retraction of the respective metering plungers as will be described elsewhere herein.

Supply, Metering, Valving and Mixing

This section describes prior art apparatus to which the present invention is preferably applied.

FIG. 1 schematically illustrates the system 1 for feeding, metering, valving (note especially bypass valves V101,V102,VX,VY and ball valves V1-V4 and pressure switches or sensors P1,P2) for controlling and mixing liquids. Isocyanate is fed into the master reservoir 5 through a supply line 75 and supply valve 76 from any suitable source such as a tank car, etc. The reservoir 5 is furnished with a supplemental pressurizing source 78 such as high pressure nitrogen supplied at a pressure of 3-5 psi. from any suitable source such as pressurized gas bottles, liquid nitrogen tank and vaporizer, or the like.

The master metering cylinder assembly 17,19 and the slave cylinder assembly 18,20 are preferably of the so-called lance design comprising a plunger that moves within a cylinder and has a substantial annular space, far greater than mechanical clearances, between the plunger and cylinder wall. Displacement from each cylinder is thus directly proportional to the volume displaced by the plunger when it is driven further into the cylinder or withdrawn from the cylinder. Furthermore, the plunger does not act to shut off the flow of liquids into the cylinders 19,20 although the valves V1-V4 are closed to shut off flow through the respective metering cylinders during the prepressurizing, injection and decompression steps (FIG. 6) and are opened during the shot preparation and wait steps when recirculation occurs. The cylinder bypass valving VX,VY allows reagent return to reservoir by being open when V1-V4 are closed and vice versa with a small amount of overlap when all are open (FIG. 6).

In the master and slave metering systems respective pumps 25,26 deliver liquid polyisocyanate and polyol from the respective reservoirs 5,6 into the feed lines 79,94 which contain valves V1 and V3. As explained below, the valves V1 and V3 are operated in unison with V2 and V4 and are closed (FIG. 6) during injection, decompression and most of the prepressurizing steps when it is desired to prevent any liquid from entering their respective cylinders and are open at those times when liquid is to be pumped through the respective cylinders 19,20. In this manner, there is continuous circulation of the respective liquids through their metering cylinders and circuit except for those specific times (prepressurizing injection, and decompression) when valves V1-V4 are closed. Bypass valves V101,V102 are open when V1-V4 are closed and vice versa. Bypass valves V101,V102 when open allow flow through two paths into mix head 10 after V1-V4 are closed by flowing through lines 84,85; 105,106 during injection and ending when the mixing head ports 125 are covered by plunger 121 advancing to 146.

Liquid, upon leaving each metering cylinder (which position at 82,104 toward its extended position 81,103) enters a mixing head feed line 84,105 which each include a pressure sensor P1,P2 respectively. Each line 84,105 directs liquid from its respective metering cylinder to the mixing head 10.

One of the two events takes place at the mixing head: first, each liquid is directed from its feed line 84,105 into the mixing chamber 9 for contact with the other liquid (or liquids if more than two are being mixed) or, second, plunger 121 prevents mixing and valves, V1-V4 are open (and V101,V102,VX,VY are closed) to recirculate each liquid to its respective liquid reservoir 5,6 through respective recirculation line conduits 85,106. Heat exchangers 86,87 to control the temperature of the returned liquid reagent are located in each return conduit 85,106.

The decompression step (FIG. 6) follows immediately after injection and consists of reverse movement of plungers 17,18 by an amount sufficient to reduce the reagent liquid pressure substantially to a predetermined low value as shown in FIG. 8C. The reverse movement is of course programmed into the sequence of events in the controller 3.

In FIG. 6 are shown a series of control events numbered SN1-15 for major manipulations during an injection sequence. When mixing is started, for example, plunger 121 is retracted just before master 17 position is sampled (SN9 FIG. 10) for the floating zero SN8. Injection SN10 thereafter starts.

As can be appreciated, the injection step includes mixing by the impingements of the jets out of slots 125 on each other. Injection also involves getting charges of material out of the master and slave cylinders 7,8 into the mixing chamber 9 and then removing them from mixing chamber 9 by the rapid advance of the plunger 121 before those chemicals can cure or otherwise solidify. At the end of prepressurizing the FIG. 10 system (see next section) operates a sample-hold switch to feed the shot length signal to comparator 501; injection begins and plungers 17,18 advance at rates commanded by velocity reference 30 and controller 3 responds to plunger 17 (FIG. 5) reaching its injection termination position 81 (being the sum of shot size S and plunger position P after the pressurizing) by driving the mix head plunger 121 from full retract 147 to its most advanced position 145. The plungers 17 and 18 are advanced at commanded injection rates for a fixed delay time after the plunger 121 closes the orifices 125 before stopping the movement of the plungers 17,18. This improves the final mixing of the components. This signifies the end of injection.

Preferred operation requires closing orifices 125 completely with plunger 121 before plunger 17 and 18 are stopped to maintain pressure during injection. The excess liquids thus entering lines 84 and 105 are returned to reservoirs 5,6. FIG. 6 shows the overlap resulting from metering plungers 17,18 driving past the closing of slots 125.

Other Aspects of Invention (FIGS. 6, 7, 8 and 9)

There are two additional features of the invention which are discussed in depth in this section: a step of decompression ("decomp" in Figs.) in the cycle of operation (e.g. steps numbered SN 11-13 of FIG. 6) and the satellite or mold selector step (e.g. SN 4-5 FIG. 6, FIGS. 7,9). The decompression step is shown in FIGS. 6, 7 and 8 while the mold selection is in FIGS. 6 and 9.

The cycle is otherwise as in the patents and allowed application which have been incorporated herein.

The steps or phases of the cycle with the features hereof are chiefly as follows:

The events are: shot preparation (wherein parts are positioned and the system is filled with reagents) which includes resetting plungers 17,19 to the same position each time (13-19 seconds FIG. 8A); wait between shot prep and prepress, the time interval for which may equal zero if there are prior shot requests from a molding station; selection of particular mold from among several by the operation of certain valves in the manifold 301,302; 401,402; prepressurizing wherein both plungers 17,19 are independently advanced while the liquid between each plunger and the mix head is prevented from flowing in or out of that part of the system and until the liquid pressures in their respective monomer systems each reaches a predetermined level (2–5 seconds FIGS. 8A,8C); injecting (5–10 seconds FIGS. 8A, 8B, 8C) by withdrawing plunger 121 to uncover at least a part of slots 125 and advancing both plungers 17,18 in a slaved relation (using the FIG. 2 control system) to maintain ratio and pushing the reagents through orifices 125 to intimately mix them within head 10; injection ends by advancing mix plunger 121 to close ports 125 and stopping the advance of plungers 17,18); and decompression (10–13 seconds FIGS. 8A-8C) wherein plungers 17,19 are reversely moved to drop reagent pressures; and next resetting as the final part of shot preparation.

The purpose of the decompression step is to reduce the liquid pressure in the system so that less power is required to operate the various valves, to reduce valve wear, and to minimize or eliminate pressure surges through the system when transferring from one event or step to another. It occurs immediately after completion of the injection step and (FIGS. 6 and 8) is achieved by operating the master and slave plungers 17 and 19 in reverse direction before operating any valves in the system, whereby the liquid pressure is dropped to some predetermined level (less than 200 psi. in FIG. 8C) at which time the pressure switches P1 and P2 (which alternatively may be pressure sensors that feed a pressure reading into comparator 501 for input into the programmable controller 3) signify the end of decompression by opening the inlet and return valves V1-V4 and opening all manifold selector valves 301-302; 401,402.

These valve openings also signify the beginning of the shot preparation step the purpose of which is to fill all the systems with the respective liquids so that they will be prepared for another injection stroke. The shot preparation step and its details have already been explained in the incorporated patents.

Herein the shot preparation is conducted by continuing the retraction or reverse direction of the master and slave plungers 17 and 19 after the valves V1-V4 and the selector or mold shut off valve manifolding 301 - 402 have all been opened. As shown in FIG. 6, the bypass valves V101,V102; VX,VY are closed a very short time after shot preparation begins and continue in that state until a prepressurizing step is initiated.

Actually, the shot preparation and decompression step conclude with positioning the plungers 17,18 at their reset position. So, in one controlled reversed stroke of the master and slave plungers 17,18 we find the present invention provides a step of decompression, shot preparation, and resetting to the same position each time.

Once the shot preparation step has concluded the system goes about selecting the next mold or clamp which is to receive a shot, i.e. into which the reagents are to be injected. We call this the mold selection step or phase and it can be seen in FIGS. 6–9 where a wait or dwell time is provided between the shot preparation and prepressurization steps. This wait time allows several things to happen, one of which is to permit the controller 3 to interrogate itself by a program as shown in FIG. 9 to determine which of the several molds (manifold valve for four are illustrated in FIG. 1 and designated i,ii,iii,iv as postscript for each set of valves operated together for selecting a given mold) are to be injected and then to operate the valves appropriately in the manifold 301-402 so that only one selected mold receives an injection. Requests for injection (so called shot requests) are queued in the order in which they are received in the control.

As shown in FIGS. 9 and 6 when a molding station such as for example station i, is selected, manifolding valves 301$i$,302$i$; 401$i$ and 402$i$ are open and the other manifolding valves are closed as the system i enters the prepressurization step. Simultaneously the bypass valves VX,VY,V101,V102 are opened and a very short time interval later the various inlet and return valves V1-V4 are closed.

Thus, if station $i$ is selected to be injected, the following manifolding valves are all closed as prepressurizing begins: 301$ii$-$iii$-$iv$; 302$ii$-$iii$-$iv$; 401$ii$-$iii$-$iv$ and 402$ii$-$iii$-$iv$. Prepressurizing, as is already explained is achieved by advancing the respective plungers 17 and 19 to build up pressure in their respective liquid system until the pressure sensors P1 and P2 indicate a threshold pressure has been achieved as is graphically illustrated in FIG. 8A. When that pressure is achieved then the injection step begins by opening the ports 125 in the mixhead.

FIGS. 7 and 9 contain features of the satellite or mold selection system. FIG. 7 shows the overlap between two successive cycles to the effect that (note FIG. 7 shot preparation step) all manifold valves 301-402 are open during the shot preparation step but only the set of valves for the selected mold are kept open while the manifold valves for the preceding selection as well as all the others are closed. Thus during shot preparation and wait time only are all the manifold valves open. Successive cycle in effect overlap only during the shot preparation step in that the manifold selector valves 301$i$,302$i$, 401$i$,402$i$ that were open in the previous cycle remain open and all the other selector valves become open during shot preparation.

FIG. 9 is believed to be self-explanatory and illustrates how a shot request is processed through the controller 3 and given immediate attention, i.e. immediately injected, if there is no preceding shot request or existing cycle of injection going on, or alternatively to place the shot request in queue on a first-come-first-serve basis, that is to be taken up in turn.

Controls of FIGS. 3, 10

FIG. 10 illustrates schematically a control system 500 for automatically establishing the requisite circuits to feed signals between or among the programmable controller 3, a comparator 501 feeding signals into same, and individual sets of operating elements to select one of the mixing stations (i) through (iv) which correspond to those mixing stations selected by e.g. operating the manifold valving 301,302, 401,402 in FIG. 1. Manually operated switches (not shown for clarity) may be provided for starting up the system which once started operates as shown herein. The FIG. 10 system also coacts with the FIG. 2 control system by providing the velocity reference signal 29 from an individual reference signal source 30$i$ . . . 30$iv$ at each mixing station $i$. . . $iv$ and feeding through a suitable mixing station contact bank 503 to switches S4A, S4B (FIG. 2).

In General

Assume for the sake of example that station i is selected by controller 3 using the program of FIG. 9 which perforce maintains open valves 301$i$,302$i$, 401$i$,402$i$ and closes the other manifolding valves. Once a mixing station is automatically selected, various relay coils 504 . . . 520 and their contacts 531-546 in bank 503 and elsewhere (FIGS. 3, 10) are manipulated as described below to establish certain circuits and send signals from the mixing station i through the control system and/or to the comparator thence to the programmable controller. These manipulations cause the operation of the FIG. 2 system in the manner described above after which the system is reset, another mixing station is selected and the sequence repeated with the newly selected mixing station.

FIGS. 10 and 11 also show means for terminating the shot preparation step and initiating the wait step. The FIG. 10 embodiment shows comparing the actual position of the master plunger 17 when it reaches the fully withdrawn position 82 (see FIG. 1) with a reference signal that represents the ideal position 82. FIG. 10 illustrates comparison of the actual position of 17 with the desired position 82. FIG. 11 shows a preferred embodiment which tells the programmable controller that the system is near the end of shot preparation and that the wait step may begin. This is done by using a reference signal representing 0.01 multiplied times the distance from 81 to 82. In this way, and because of the floating zero flexibility aspects, the system has a small tolerance which can allow for minor shot-to-shot fluctuations in position 82 which might occur for various and sometimes random reasons.

Shot Preparation

This must be completed and a wait phase entered (e.g. FIG. 7) to put the system in condition for going through another cycle for injection. Completion of shot preparation is called resetting. At the end of shot preparation the elements of the system are all at their home position, e.g. plungers 17 and 18 are fully retracted and the mixing plunger 121 is fully advanced. Resetting is accomplished by feeding the reference reset signal 174 into the FIG. 2 control system by maintaining switches S7 and S9 closed for a time sufficient to retract plungers 17,18 to reset positions 82,104. The programmable controller (see FIG. 3) manipulates switches S7,S9 in its response to signals from the comparator 501 indicating end of the decompression step, hence indicating a previous cycle has been completed and the system ought be reset. Note that one advantage of the floating zero is that imperfect retraction to positions 82,84 will still allow the system to work perfectly as long as the full injection stroke can be provided without malfunction. Thus, the term floating zero.

Prepressurization

When this step begins, the reader should keep in mind that a selected mixing station $i$ has been selected by the FIG. 9 logic, the selector valves 301,302, 401,402 are operated which is done most conveniently by activating solenoid relays which in turn either directly operate solenoid valves or cause same to be operated by manipulating contacts. Prepressurizing is initiated by the programmable controller activating coil 516 and leaving the other three coils 517,518 and 520 inactive. (If additional mixing stations such as ii and iii were illustrated, it should be understood that relay coils representing them are likewise left inactive). Coil 516 in turn closes the following contacts in selector bank 503: 531, 532, 533 and 534 which are, respectively, to determine the master and slave threshold pressures 522$i$ and 523$i$, to determine shot size 524$i$ by the length of stroke of master plunger 17, and to establish an injection velocity signal 29$i$ which is passed into the control system of FIG. 2 when contacts S4A,S4B are closed as shown in both FIGS. 2 and 10. After coil 516 is operated, the controller 3 operates coil 512 (to close contacts 536 and open the normally closed contacts 550) and coil 510 (to close 546 and open normally closed 540) to transmit threshold reference pressure signals 522$i$,523$i$ to the comparator 501 where they are compared with the signals P1,P2 representing the actual system pressures. At a later time these connections will be reversed so that decompression step can occur by a similar comparison with decomposition reference signal 549 transmitted when 550,540 return to their normally closed state, and 536,546 return to their normally open state.

When station iv is selected, coil 520 is activated in the same fashion and for the same reasons as 516 to close contacts 541,542,543 and 544, mutatis mutandis. However, coils 512 and 510 work as described for station i.

Similarly, coils 517,518 are activated responsive to selection stations $ii$ or $iii$, respectively to operate like sets of contacts (not shown) but 512 and 510 work as before.

After coil 516 (or its counterparts 517,518,520) is activated, controller 3 closes contacts S5,S6 for the prepressurizing duration, i.e. until both threshold pressures are met.

Prepressurizing ends when both of the reagents have reached respective threshold pressures. The pressures are transduced into electrical signals and electrical comparisons are made.

Injection: Floating Zero

An important floating zero function takes place during prepressurizing in the FIG. 10 circuit involving sample and hold means 551 and an adding means 552. When both of the threshold pressures at P1 and P2 have been reached, the programmable controller 3 responds by impressing a sample signal on sample and hold 551 which samples the position feedback signal 47 and stores the signal representing its value, which is constant, at that point in time when the starting position has been reached as determined by both threshold pressures. The starting position 47 is added to the reference shot size 524 (applied through relay contacts 533) in the summing means 552 and this sum signal is applied to the comparator 501. At the same time the signal 47 without being sampled is applied to the comparator but this signal is not constant and varies during injection with the position of the master plunger as already described. When the actual plunger position as indicated by the varying signal 47 applied to comparator 501 equals the constant signal derived from summing means 552 — then is when the injection is stopped by the routine mentioned above to arrest motion of the plunger 17,18 and block the port 125.

Thus, it can be seen that summing means 552 provides an injection termination reference position based upon a floating zero reference signal that is changed or sampled with each injection cycle. Said injection termination reference position represents the sum of the starting position signal 47 at the end of prepressurization and the reference shot size as a way of telling the system where the master plunger must stop.

Injection

Details of the injection operation should be clear from the discussion given with reference to FIG. 2 except that the reference signals such as velocity 29$i$ and the just discussed pressure reference signal are drawn from the selected mixing station — here $i$ — because the contacts 531,532, 533, and 534 have all been closed by operating relays.

Short Shot

The comparator also includes means to interrupt the routine if a short shot occurs, i.e. if insufficient reagent is passed through the system into the mold and the mold is not filled due to insufficient stroke capacity of 17 or 18. FIG. 10 shows means for this. The idea is to interrupt the cycle, cancel out what is left of it, reset the system, and go on to the next cycle. The short shot system of FIG. 10 provides for the interrupt and the controller takes care of the other steps just mentioned. Basically, the idea is to compare the actual position of either of the plungers 17,18 as determined by the position sensing means potentiometers 45,68. Comparison of the maximum position permitted indicated by reference signal 554 with the actual position signal will give a "short shot" or malfunction signal when the two are equal, that is in most instances when the plunger has advanced so far that it is at a failsafe position represented by signal 554. This is true regardless of which plunger 17,18 is applied.

Recapitulation

To recapitulate the invention is an improved method of feeding first and second liquids to be mixed in substantially a predetermined ratio into contact with each other within a mixing chamber 9 that is connected to a molding cavity 12 via respective first and second liquid feed systems 84,85,87; 105,106,86 having respective first 7,17,19 and second 8,18,20 reciprocable plunger metering pumps each of which feeds into a flow restriction 125 leading into such chamber, the second metering pump bearing a slave relationship to said first metering pump (master) and being operated through ratio control means 131V,231V to feed the second liquid in substantially the predetermined ratio relative to the feeding of the first liquid. The improvement comprises resetting and operating the plunger 17,18 on each pump by steps of: retracting (SN15, FIG. 6) both said first and second plungers 17,18 each to substantially the same 82,104 position 82, each time that the system is reset; filling (FIG. 6, SN2-3) at least that portion of each liquid system between (e.g. 84;105) and including its respective pump 7...17; 8...20 and its flow restriction 125 with its respective liquid; prepressurizing (SN4...7, FIG. 6) both of the first and second liquid systems to respective preselected first and second pressures by advancing the plunger of each pump 17,18 while preventing any substantial flow into or out of such systems as by closing V1-V4; in response to each of said first and second liquid systems having reached its respective said preselected pressure, injecting and mixing (SNB,9,10, FIG. 6) by advancing each plunger through its respective stroke (S,s FIG. 5) by moving the plunger of the first metering pump through its predetermined stroke while maintaining said ratio and moving the second plunger through a stroke responsive to the first plunger (e.g. the FIG. 2 system of 33,131V,231V,1100,52) and while feeding both liquids through their respective orifices into said mixing chamber 9; stopping the moving of the plungers and the flow of both liquids into the mixing chamber; and resetting (SN15) the plungers by returning them each to its starting position and repeating the cycle thereafter.

The invention also includes the further steps (FIG. 9) of providing a plurality of mixing chambers 9 each associated with a respective molding cavity 12 and each chamber being selectively connectable to the first and second feed systems as through the valve manifolding 301i . . . 402iv; prior to any prepressurizing step selecting one of the mixing chambers into which said feeding is to be conducted; (FIG. 6, SN4,5) and further including the step of selecting at least for the plunger of the first (master) metering pump 8 . . . 20 a predetermined stroke (FIG. 9) for injecting the liquid quantity required by the mixing chamber that has been so selected.

Stated another way, the method may include controlling liquid feeding to one chamber of a plurality of chambers in a satellite, or peripheral system and may have the additional steps of selecting said one chamber and establishing a flow path between it and the feeding means and blocking the flow paths between the rest of the plurality and the feeding means (as by selectively operating valves 301i . . . 402iv).

The method may also include selecting a different mixing chamber than on the preceding step (FIG 6, SN4,5).

Decompression (FIGS. 6,7,8) is also part of the invention and comprises the step of pulling back both said metering pump plungers (FIG. 6 SN11,SN13) after said stopping step by an amount less than said stroke and sufficient to reduce the pressure downstream of each said pump to a respective predetermined lower pressure. The invention may also encompass establishing a flow path for each of said liquids to and away from said mixing chamber while continuing to stop the flow into said chamber (by blocking ports 125 with 121) in the time interval between said retracing and resetting steps (i.e. recirculating).

Conclusion

Thus, it will be seen that the present invention involves new and important cycle events: resetting to the same position each time prepressurizing from that point to the starting point for injection (we call this a floating zero because the shot size always is measured from the master plunger's position after prepressurizing pressure is reached rather than from a predetermined plunger position); decompression; and mold selection. Thus, we are able to achieve the so called floating zero feature with its advantages of simpler mold selection programming and better shot size control; to minimize transient pressure pulses and valve opening forces by reason of decompression, and in general to facilitate operation of a multiple mold system where a plurality of molds are serviced by metering system of the sort illustrated in FIGS. 1 and 2 by way of example. Other objects, advantages and features can be realized by those skilled in the art.

What is claimed is:

1. In a method of feeding to a first-selected mixing chamber, from which mixed liquids are expelled into a molding cavity, first and second liquids to be mixed in substantially a predetermined ratio within said mixing chamber, in which method said mixing chamber is selected from at least two mixing chambers each of which requires a different quantity of liquid than the other mixing chamber and is connected to a molding cavity, said feeding being via respective first and second liquid feed sytems having respective first and second reciprocable plunger metering pumps each of which feeds into its respective flow restriction leading into such first-selected chamber, said second metering pump bearing a slave relationship to said first metering pump and being operated by ratio control means to feed said second liquid in substantially said predetermined ratio relative to the feeding of said first liquid --- the improvement of resetting and operating the plunger on each pump comprising the steps of providing at least two of said mixing chambers each associated with a respective molding cavity and each such chamber being selectively connectable to said first and second feed systems so that both liquids can be fed at the same time into the selected one of said mixing chambers;

retracting both said first and second plungers each to substantially the same starting position each time that the system is reset;

filling at least that portion of each liquid system between and including its respective pump and its said flow restriction with its respective liquid;

prior to the next said prepressurizing step selecting one of said mixing chambers into which said feeding is to be conducted, including selecting for the plunger of said first (master) metering pump a predetermined stroke different from the stroke for the other of said at least two mixing chambers for injecting the liquid quantity required by the first selected mixing chamber;

prepressurizing both said first and second liquid systems to respective preselected first and second pressures by advancing the plunger of each pump while preventing any substantial flow into or out of such system;

in response to each of said first and second liquid systems having reached its respective said preselected pressure, injecting and mixing by advancing each said plunger through its respective stroke by moving the plunger of said first metering pump through its predetermined stroke while maintaining said ratio and moving said second plunger through a stroke responsive to said first plunger and while feeding both said liquids through their respective flow restrictions into said mixing chamber;

stopping the moving of said plungers and the flow of both said liquids into said mixing chamber; and retracting each said plunger to its said starting position, selecting the other of said two mixing chambers and repeating the remainder of the aforesaid steps mutatis mutandis for feeding in said ratio to the newly selected mixing chamber.

2. The improved method according to claim 1 comprising the step of stopping both said plungers from moving in the event that the position of either plunger exceeds a predetermined maximum plunger movement from said starting position and in response to such event to reset the system as aforesaid.

3. An improved method according to claim 1 further comprising the step of retracting said first metering pump plunger after said stopping step by an amount substantially less than said stroke sufficient to substantially reduce the pressure downstream of said first pump.

4. An improved method according to claim 1 further comprising the step of pulling back both said metering pump plungers after said stopping step by an amount less than said stroke and sufficient to reduce the pressure downstream of each said pump to a respective predetermined lower pressure.

5. An improved method according to claim 1 further comprising the step of establishing a flow path for each of said liquids to and away from said mixing chamber while continuing to stop the flow into said chamber in the time interval between said retracting and resetting steps.

6. In a liquid reaction molding method, an improved control for feeding both a first liquid and a second liquid in respective predetermined relative amounts into one mixing means selected from at least two mixing means, the total amount of liquids fed into each mixing means being respectively different and the feeding of said first and second liquids being by first and second feeding means, respectively, each of which feeding means includes a positive displacement device, comprising the steps of:

selecting said one mixing means and establishing a flow path between it and each of said feeding means and blocking the flow path between the remainder of said at least two mixing means and said feeding means;

moving the positive displacement feeding means to a predetermined starting position that is substantially the same for successive feedings and which provides sufficient displacement capacity for feeding that a clearance volume remains therein at the termination of the feeding step;

filling with liquid each of said feeding means and at least that portion of the flow path between each of said feeding means and said one mixing means;

prepressurizing said filled flow path portion to a preselected threshold pressure level by operating said feeding means to positively displace liquid therefrom into said filled flow path portion while preventing any substantial flow into or out of such filled flow path portion;

in response to completing said prepressurizing step, injecting liquid from said filled flow path portion by operating both said feeding means to positively displace a predetermined amount of each liquid, respectively, therefrom into said mixing chamber;

thereupon stopping the flow of both said liquids and thereafter resetting said feeding means by a moving step as aforesaid; and repeating the cycle by, in said selecting step, the selection of another of said at least two mixing chambers and after repeating the moving, filling, and prepressurizing steps as above, mutatis mutandis, conducting the injecting step by operating said feeding means to positively displace a predetermined amount of liquid that is different from the first said predetermined amount into the second selected mixing chamber.

* * * * *